Patented June 1, 1948

2,442,582

UNITED STATES PATENT OFFICE 2,442,582

OXAZOLINE REACTION PRODUCTS

John W. Bishop, Cranford, N. J., assignor to Tide Water Associated Oil Company, Bayonne, N. J., a corporation of Delaware No Drawing. Application August 10, 1946, Serial No. 689,818

5 Claims. (Cl. 260—307)

The present invention relates to the production of new derivatives of oxazoline compounds and esters of phosphoric acids.

Generally speaking, the novel compounds provided by the present invention comprise the reaction products obtained by reacting an oxazoline with an ester of phosphoric acid, a suitable example of such a reaction product being represented by the following structural formula:

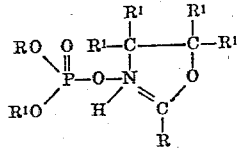

in which R may represent an alkyl, aryl, alkene or alicyclic radical and $R^1$ may represent an alkyl, aryl, alkene or alicyclic radical or hydrogen.

In accordance with the present invention, I have found that the novel products may be produced by reacting oxazoline compounds with esters of phosphoric acids, and the reaction upon which the present invention is based appears to proceed in the following manner:

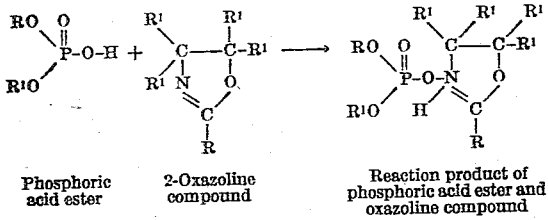

| Phosphoric acid ester | 2-Oxazoline compound | Reaction product of phosphoric acid ester and oxazoline compound | wherein R may be an alkyl, aryl, alkene or alicyclic radical and $R^1$ may stand for alkyl, aryl, alkene or alicyclic radicals or hydrogen.

In the reaction as set forth hereinbefore, and which is described in more detail hereinafter, whereby phosphoric acid esters are reacted with oxazolines to provide novel compounds such as embodied by the present invention, it appears that the hydrogen of the phosphoric acid ester is transferred to the nitrogen of the oxazoline compound and a bond is formed between the nitrogen and one of the oxygens of the phosphoric acid ester, the phosphoric acid ester and the oxazoline nuclei otherwise remaining intact.

In preparing the novel compounds by reacting oxazolines with phosphoric acid esters, the phosphoric acid esters that may be employed to provide the novel compositions include mono and di-esters of phosphoric acids. More particularly, I prefer to employ, in my practice of the present invention, the dialkyl esters of phosphoric acids, as for example, dilauryl acid phosphate, for reaction with oxazolines. Generally speaking, the oxazoline compounds that are employed for reaction with phosphoric acid esters to provide my novel compounds comprise compounds having the oxazoline structure, a particular effective type of which is 2-oxazoline containing the following radical:

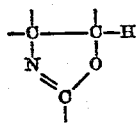

Although the present invention in its broad aspect, embodies the novel reaction products such as set forth hereinbefore, I prefer, in my practice of the invention, to employ as oxazoline reactants the oxazoline compounds in which one or more of the carbon atoms carries at least one radical containing a high number of carbon atoms, as for example, a long chain alkyl or alkene radical. Preferably, the radical containing a high number of carbon atoms is attached to the carbon atom between the nitrogen and the oxygen of the oxazoline ring. More specifically, the preferred type of oxazoline compounds employed in carrying out the present invention may be represented by the following formula:

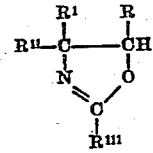

in which R, $R^1$ and $R^{11}$ may be alkene, alkyl, alicyclic or aryl groups or hydrogen and $R^{111}$ may be an alkyl, alkene, alicyclic or aryl group. $R^{111}$ is desirably an organic radical containing a high number of carbon atoms, as for example, of such chain length as may be obtained as an alkyl or alkene residue from a higher fatty acid. Thus, examples of oxazoline compounds such as I have found to be particularly effective in carrying out my invention are the reaction products provided by reacting oleic acid with 2-amino-2-methyl-1-propanol, said reaction product having the formula:

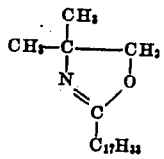

and the reaction product such as provided by reacting oleic acid with 2-amino-1-butanol or 2-nitro-1-butanol, said reaction product having the formula:

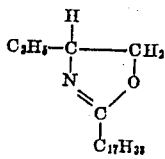

Other oxazoline compounds which may be suitably employed in accordance with the present invention to provide the novel phosphoric acid ester-oxazoline reaction product, and methods for preparation of the oxazoline reactant, are well-known to the art, as for example, as set forth in the United States Patents Nos. 2,372,409 and 2,372,410.

Thus, in accordance with the present invention, and as will be appreciated from the examples set forth hereinbefore, oxazoline compounds may be reacted with phosphoric acid esters, preferably such esters containing at least one radical having a high number of carbon atoms, and more particularly alkyl and alkene radicals, to provide the novel reaction compounds of the present invention. Although the present invention, in its broad aspect, embodies the reaction products of phosphoric acid esters and oxazolines, I prefer, in my practice of the invention, to employ as phosphoric acid ester reactants, the phosphoric acid esters containing at least one alkyl or alkene radical having a high number of carbon atoms, as for example, such as provided when employing the following as phosphoric acid ester reactants:

Dilauryl acid phosphate
Monoamyl phosphoric acid
Monolauryl phosphoric acid
Monocardanyl phosphoric acid
Dioctyl acid phosphate
Dioctadecyl acid phosphate
Dicetyl acid phosphate The novel compounds provided by the present invention have been found to be particularly effective for inhibiting the rusting of metals, particularly ferrous metals, when applied, in any suitable manner, to metal surfaces to provide a coating thereon whereby the metal surface is protected against rusting and/or corrosion by atmospheres corrosive to metals. For such purposes, the reaction product of a phosphoric acid ester-oxazoline reaction may be employed per se, or in mixture with one or more other reaction products of a similar reaction wherein different oxazoline and phosphoric acid ester reactants are employed. In other words, and for the purposes of illustration, the present invention provides novel compounds which are suitable for use as rust-inhibitors for metals, said compounds comprising reaction products per se of an oxazoline reacted with an ester such as dilauryl acid phosphate, or a mixture comprising said reaction product and a product obtained by reacting an oxazoline with another ester such as dicetyl acid phosphate, or other combinations of such reaction products obtained by reacting oxazolines with phosphoric acid esters.

Furthermore, the novel phosphate ester reaction compounds of the present invention exhibit excellent rust-preventive properties for metals when such compounds are employed in compositions comprising said reaction products and a suitable vehicle therefor, preferably in compositions comprising a minor proportion of the reaction compounds and a major proportion of vehicle, such as an oil, i. e., hydrocarbon lubricating oil, or other suitable hydrocarbon or non-hydrocarbon substance. Thus, when it is desired to provide rust-preventive compositions comprising the novel compounds and a hydrocarbon vehicle therefor, I prefer to employ as reactants phosphoric acid esters having at least one radical containing a high number of carbon atoms whereby good hydrocarbon solubility is imparted to the product obtained by reacting such an ester with an oxazoline. For such purposes, it is preferable to employ as the phosphoric acid reactant a phosphoric acid ester containing a radical, such as an alkyl or alkene radical having about 8 to about 18 carbon atoms, and more preferably, from about 12 to 18 carbon atoms. Hence, particularly effective rust-inhibitors of the novel compounds provided by the present invention comprise compounds obtained by reacting phosphoric acid esters such as dilauryl acid phosphate, dicetyl acid phosphate and dioctadecyl acid phosphate with oxazolines having a formula such as hereinafter designated as formula A and formula B.

Generally speaking, and in accordance with the present invention, the novel compounds embodied thereby may be prepared by establishing a mixture of phosphoric acid ester and an oxazoline as reactants. The reactants are generally employed in approximately equimolar quantities, although proportions of phosphoric acid esters to oxazolines other than in equimolar amounts may also be satisfactorily employed. However, when the novel compounds provided by the present invention are contemplated for use as rust-preventives for metals, it is preferable to carry out the reaction by employing an amount of phosphoric acid ester in excess of equimolar proportions, as for example, by employing a proportion of about one mole of oxazoline with an excess, i. e., up to about two moles, of phosphoric acid ester. By employing an excess of ester in the reaction, the presence of unreacted oxazoline in the reaction compound is substantially minimized, providing more satisfactory results when such compounds are employed as rust-inhibitors, as I have found that the presence of unreacted oxazoline in the reaction product has a tendency to decrease the effectiveness in rust-inhibition properties of the reaction compound whereas the presence of unreacted phosphoric acid ester in the reaction compounds do not appear to deleteriously affect the rust-preventive properties.

The novel compounds provided by the present invention may be prepared by establishing a mixture containing the desired amounts of phosphoric acid ester and oxazoline and allowing the mixture to react whereby the novel reaction products are obtained. Preferably, the mixture is established by adding the phosphoric acid ester to the oxazoline and the mixture agitated such as by stirring or other suitable means, until the reaction is complete and a homogeneous mass comprising the novel compounds is obtained. The reaction takes place very rapidly over a wide range of temperatures, including normal room temperatures of about 70° F. to 80° F. In many cases, the reactants, i. e., the oxazoline and phosphoric acid ester, employed are liquid, and hence, the reaction mixture may be simply prepared by adding the reactants together to form a solution which is allowed to react, preferably while stirring, to form the novel reaction compounds. However, when at least one of the reactants employed is a solid, or other than liquid, such as when employing monolauryl phosphoric acid, preparation of the novel compounds may be expedited by establishing a mass comprising the reactants, preferably heating the mass to effect dissolution of the reactants, and allowing the mass to react whereby the novel compounds are obtained. When one or both of the reactants are solid substances, and heating is employed to effect solution of the reaction mass, such heating need not be continued after solution of the reactants has been effected, as once the reactants are in solution, continued heating of the reaction mass is not necessary to effect reaction between the acid ester and the oxazoline as the reaction generally proceeds rapidly over a wide range of temperature, including normal room temperature of about 70° F. to 80° F. When it is found preferable to heat the mass comprising the reactants to expedite dissolution thereof, the temperature of the mass should not be allowed to reach the temperature at which any of the reactants or the products of reaction will be deleteriously affected, as for example, by chemical decomposition of the reactants or products of reaction.

The following are set forth as examples illustrating preparation of novel compounds such as contemplated by the present invention.

Example I

A mixture was prepared by adding dilauryl acid phosphate in equimolar proportions to an oxazoline having a formula such as hereinafter referred to and designated as formula A and formula B. By means of stirring, the mixture was agitated during addition of the dilauryl acid phosphate. The initial temperature of the mixture was 75° F. The reaction between the dilauryl acid phosphate and oxazoline proceeded with evolution of heat and reached completion very rapidly whereby on cooling to room temperature, such as about 70° F., a homogeneous dark-colored viscous mass was obtained comprising the reaction product of dilauryl acid phosphate and the oxazoline providing a novel compound such as embodied by the present invention.

Example II

A mixture was prepared as in Example I, except that dioctyl acid phosphate was employed in place of dilauryl acid phosphate. The initial temperature of the mixture was 76° F. The reaction proceeded with evolution of heat and reached completion quickly whereby on cooling of the mass to room temperature, such as about 70° F., a dark-colored viscous mass was obtained comprising the reaction product of diocytyl acid phosphate and the oxazoline providing a novel compound such as contemplated by the present invention.

Example III

A mixture was prepared as in Example I, except that monocardanyl phosphate acid was employed in place of dilauryl acid phosphate. The initial temperature of the mixture was 82° F. The reaction proceeded with evolution of heat and reached completion very rapidly whereupon on cooling of the reacted mass to room temperature, such as about 70° F., a dark-colored semi-fluid homogeneous mass, more viscous than the reaction products of Examples I and II, was obtained comprising the reaction product of monocardanyl phosphoric acid and the oxazoline.

Although the remarks set forth hereinbefore are directed to a procedure found entirely satisfactory for preparing my novel compounds, it will be apparent to those skilled in the art that various modifications may be made in the procedure without departing from the spirit of my invention. Hence, I do not intend to limit my invention to the method hereinbefore set forth for preparing my novel compounds, as my invention also embodies the novel phosphate ester reaction compounds prepared by methods other than herein set forth.

In my practice of the present invention, I have found that in formation of the novel compounds obtained by reacting oxazolines with phosphoric acid esters, the reacted mass is substantially all homogeneous with substantially no tendency to separate into components thereof. Furthermore, as is set forth in more detail hereinafter, the homogeneous reacted mass has a viscosity higher than the viscosity of the individual reactants employed. Moreover, when the reaction products of an oxazoline and a phosphoric acid ester provide a solid, such as of a wax consistency, in cooling of the reaction mass to normal temperatures, such as about 70° F., the solidfied mass is homogeneous with substantially no tendency to separate into components thereof. Accordingly, it will be appreciated that chemical combination occurs between phosphoric acid esters and oxazolines to provide stable reaction products thereof comprising novel compounds such as contemplated by the present invention.

During reaction of the oxazolines with phosphoric acid esters, a considerable amount of heat is generally produced in formation of the reaction products, i. e., the novel compounds provided by the present invention, as is more clearly shown in the tabulation set forth hereinafter showing the temperature increase of reaction mixtures obtained by establishing, and allowing to react, a mixture comprising equimolar proportions of an oxazoline of the formula hereinafter referred to as formula A and formula B and a phosphoric acid ester such as set forth in the tabulation. As will be noted from the data set forth, the final temperature of the mass, when the reaction is completed and the reaction products formed, is considerably higher in each case than the initial temperature of the mixture.

| Phosphoric acid ester | Temperature, ° F. | |
|---|---|---|
| | Initial | Final |
| Dilauryl acid phosphate | 75 | 106 |
| Menoamyl phosphoric acid | 80 | 125 |
| Monocardanyl phosphoric acid | 82 | 117 |
| Dioctyl acid phosphate | 76 | 96 |

The reaction products comprising the novel compounds of the present invention show marked changes in physical characteristics, such as viscosity, over the viscosity values of the individual reactants, or over compositions comprising unreacted mixtures of phosphoric acid and oxazolines. For example, dilauryl acid phosphate has a viscosity of about 532 Saybolt Universal seconds at 100° F., and oxazoline compounds of the following formulas have a viscosity of 338 Saybolt Universal seconds at 100° F.

Formula A
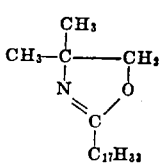

Formula B
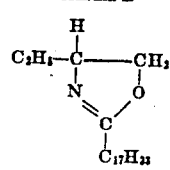

However, when the dilauryl acid phosphate and an oxazoline such as the foregoing are reacted in approximately equimolar amounts, the viscosity of the reaction product formed thereby is about 5590 Saybolt Universal seconds at 100° F., i. e., a viscosity considerably greater than the initial viscosity of 532 Saybolt Universal seconds and 338 Saybolt Universal seconds of the ester and oxazoline reactants employed.

Although the present invention has been described in conjunction with certain preferred embodiments thereof, those skilled in the art will readily recognize that variations and modifications can be made. Such variations and modifications are to be considered within the purview of the specification and the scope of the appended claims.

I claim:

1. As a new composition, a quaternary ammonium salt of an acid ester of a phosphorus acid and an oxazoline compound of the formula

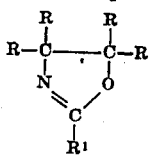

in which R is a member of the group consisting of hydrogen, alkyl, aryl and acyloxyalkyl and $R^1$ is a long chain alkyl radical.

2. As a new composition, a quaternary ammonium salt of an alkyl acid ester of phosphoric acid and an oxazoline compound of the formula

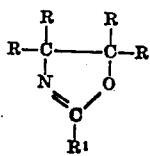

in which R is a member of the group consisting of hydrogen, alkyl, aryl and acyloxyalkyl and $R^1$ is a long chain alkyl radical.

3. As a new composition, a quaternary ammonium salt of an aryl acid ester of phosphoric acid and an oxazoline compound of the formula

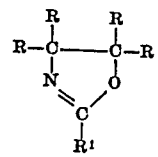

in which R is a member of the group consisting of hydrogen, alkyl, aryl and acyloxyalkyl and $R^1$ is a long chain alkyl radical.

4. As a new composition, a quaternary ammonium salt of an acid ester of a phosphorus acid and an oxazoline compound of the formula

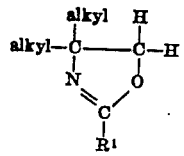

in which $R^1$ is a long chain alkyl radical.

5. As a new composition, a quaternary ammonium salt of an acid ester of a phosphorus acid and an oxazoline compound of the formula

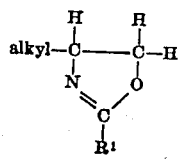

in which $R^1$ is a long chain alkyl radical.

JOHN W. BISHOP.

REFERENCES CITED

The following references are of record in the file of this patent:

UNITED STATES PATENTS

| Number | Name | Date |
|---|---|---|
| 2,334,711 | Kendall et al. | Nov. 23, 1943 |
| 2,397,381 | Smith et al. | Mar. 26, 1946 |

Certificate of Correction

Patent No. 2,442,582. June 1, 1948.

JOHN W. BISHOP

It is hereby certified that errors appear in the printed specification of the above numbered patent requiring correction as follows: Column 5, line 73, for "diocytyl" read *dioctyl*; column 6, line 4, for the word "phosphate" read *phosphoric*; line 40, for "solidfied" read *solidified*; and that the said Letters Patent should be read with these corrections therein that the same may conform to the record of the case in the Patent Office.

Signed and sealed this 3rd day of August, A. D. 1948.

[SEAL]

THOMAS F. MURPHY,
*Assistant Commissioner of Patents.*